Patented Feb. 27, 1923.

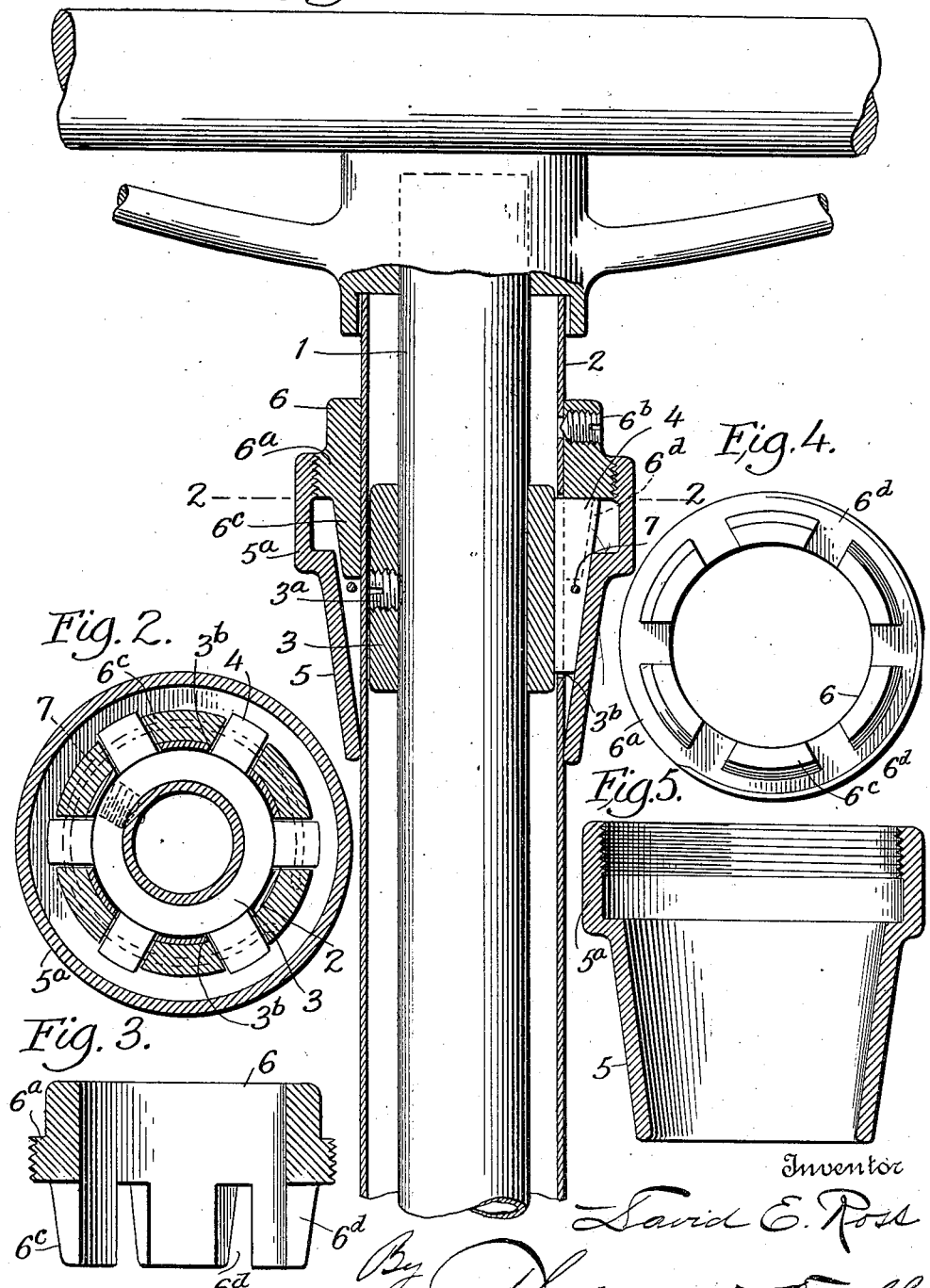

1,447,042

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

ROAD-SHOCK REGULATING DEVICE FOR STEERING GEARS.

Application filed May 24, 1922. Serial No. 563,423.

*To all whom it may concern:*

Be it known that I, DAVID E. ROSS, a citizen of the United States, residing at La Fayette, in the county of Tippecanoe and State of Indiana, have invented certain new and useful Improvments in Road-Shock Regulating Devices for Steering Gears; and I hereby declare that the following is a full, clear, and exact description thereof, reference being had to the accompanying drawings, which form part of this specification.

This invention relates to steering gears for automobiles and its objects are to provide novel means by which the transmission of "road shocks" to the driver may be greatly lessened if not wholly prevented; and also to provide means by which the driver may himself regulate the extent to which the road shocks are transmitted through the steering gear to the hand wheel.

By "road shocks" it is meant the movements of the steering wheel due to unevenness in roads and transmitted from the vehicle wheels back through the steering mechanism and gear to the steering wheel.

In the embodiment of the invention shown this device is in the form of a novel clutching mechanism by which the steering shaft or tube may be frictionally but yieldingly bound to the outer stationery casing or tube, so that casual relative rotation motion between the two parts will be prevented as hereinafter explained.

I will explain the invention with reference to the accompaning drawings which illustrate one practical embodiment thereof, and an understanding of the device illustrated in said drawings will enable others to adapt and use the invention and embody it in other forms within the scope of the invention. Therefore, I refer to the claims for summaries of the essentials of the invention, and novel features of construction and novel combinations of parts for all of which protection is desired.

In said drawings:

Fig. 1 is a vertical section through a portion of a steering gear adjacent the steering wheel and showing the at present preferred form of mechanism for controlling the transmission of road shocks to the steering wheel.

Fig. 2 is a transverse section on the line 2—2 Fig. 1.

Figs. 3, 4 and 5 are detail views.

In the drawings, 1 designates the steering shaft of a steering gear, such as used on automobiles, and which may be of any desired construction. The steering shaft is arranged within the usual outer stationary casing 2 concentric to the steering shaft. Upon the steering shaft 1, near the upper end of the casing 2 is a collar 3 which is rigidly attached thereto in any suitable manner and is shown as fastened by a set screw 3ª.

In the casing 2 directly opposite the collar 3 are formed a series of equi-spaced slots 3ᵇ which are preferably rectangular and slightly shorter than the sleeve 3. In these slots are supported a series of wedge members or blocks 4, which may be of any suitable material, and are preferably tapered on their outer surfaces, their upper ends being shown as larger than their lower ends, and the inner faces of these blocks have a direct frictional contact with the collar 3.

The blocks 4 are held in the slots by means of an adjustable conical member 5 which loosely surrounds the sleeve casing 2 and has its inner surface tapered correspondingly to the outer surfaces of the wedge block 4. The conical member 5 extends above the upper end of the wedge blocks 4 and has an annular enlargement 5ª at its upper end which is internally threaded to engage in externally threaded enlargement 6ª on a collar 6 which is rigidly secured to the casing 2, above the wedge blocks, in any suitable manner as by a set screw 6ᵇ.

The collar 6 is provided with an annular contracted portion 6ᶜ below its threaded portion 6ª extending into the tapered portion of member 5, the exterior diameter of the parts 6ᶜ being less than the interior diameter of the upper part of member 5, so as to permit lateral and longitudinal adjustment of the member 5 on the part 6, to enable the part 5 to force the wedge blocks 4 radially inward to engage the exterior surface of collar 3 with any desired frictional pressure.

The part 6ᶜ is preferably provided with slots 6ᵈ, adapted to receive the upper ends of the wedge blocks 4 and prevent these blocks turning or tilting laterally out of the slots 3d which are shallow because of the thinness of the walls of the casing 2.

By turning member 5 on collar 6 member 5 can be moved up or down; and when it is moved upward the inner conical tapered surface of member 5 will engage the opposed tapered surfaces of the wedge blocks 4 and force the latter radially inward causing their inner faces to bind with more or less pressure against the exterior face of the collar 3, according to the adjustment of the member 5.

Suitable means may be provided for causing the wedge blocks to separate from the collar 3 when the member 5 is moved downward to release the wedge blocks. As shown a contracted circular wire spring 7 is engaged with transverse perforations in the blocks 4 (see Figs. 1 and 2) and will by its expansive action tend to spread the blocks 4 outwardly and withdraw them from the collar 3, when permitted to do so by the downward adjustment of member 5.

In the preferred form of the invention the device for binding the steering shaft is placed immediately under the steering wheel where it is readily accessible and under complete control of the driver at all times.

The invention provides a novel means by which the driver can yieldingly bind the steering shaft to the steering casing in such manner as to relieve himself of the annoying jerking motions of the steering wheel caused by each road shock. For example, if the steering gear has a reduction of 1 to 10 of straight bevel gears with no interlocking helices then 50 pounds pressure exerted on the front wheel trunnion shafts would only exert a pressure of 5 pounds on the steering wheel shaft, therefore a very small amount of binding pressure on the steering wheel shaft would counteract the high rotative pressure on the trunnion shaft. In the types of steering gears in which worms are employed very much less pressure on the steering wheel shaft would suffice to nullify all the road shocks, and prevent transmission thereof to the driver's hands on the steering wheel.

What I claim is:

1. In combination a steering shaft, friction wedge members engaging said shaft; a stationary member engaging said wedge members, and means for adjusting the wedge members to regulate their binding of the said shaft.

2. In combination with a steering shaft, and a relatively fixed member; of frictional wedge members engaged with the steering shaft and cooperating frictional means connected with the relatively fixed member whereby the steering shaft may be yieldingly held against rotation to lessen the transmission of road shocks to the wheel while permitting manipulation of the wheel for steering.

3. In combination a steering shaft, a friction member thereon, relatively stationary friction members adapted to engage the member on the shaft, a stationary support for said relatively stationary friction members, and means for adjusting the relatively stationary clutch members to regulate the frictional contact between the opposed friction members.

4. In combination with a steering shaft, a casing, radially disposed clutch members around the shaft, and movable longitudinally thereof; and an adjustable member engaging the clutch members whereby they may be caused to yieldingly bind the shaft for the purpose specified.

5. In combination with a steering shaft and its casing; radially disposed clutch members surrounding the shaft, a rotatable conical member engaging the clutch members, and a fixed member on the casing engaged by said conical member, whereby the clutch members may be caused to bind the shaft for the purpose specified.

6. In combination with a steering shaft, and a casing for said shaft having a series of slots; wedge blocks mounted in the slots, and an adjustable member adapted to cause the blocks to bind the shaft, substantially as described.

7. In combination with a steering shaft, and a casing for said shaft having a series of slots; of wedge blocks mounted in the slots, a rotatable member mounted on the casing and surrounding the blocks and adapted to cause the blocks to bind the shaft when adjusted in one direction, substantially as described.

8. In combination a steering shaft, a casing having an annular series of slots, a series of wedge blocks mounted in said slots, an exteriorly threaded collar attached to the casing, a rotatable member engaging said collar and having a tapered portion engaging the wedges, whereby the wedges may be caused to bind the steering shaft, substantially as described.

9. In combination a steering shaft, a casing having an annular series of slots, a collar on the steering shaft opposite the slots, a series of wedge blocks mounted in said slots adapted to engage the collar, an exteriorly threaded collar attached to the casing, and a conical member engaging the latter collar and having a tapered portion engaging the wedges, whereby the wedges may be caused to frictionally engage the collar on the steering shaft, substantially as described.

In testimony that I claim the foregoing as my own, I affix my signature.

DAVID E. ROSS.